US008050907B2

(12) United States Patent  (10) Patent No.: US 8,050,907 B2
Baisley et al.  (45) Date of Patent: Nov. 1, 2011

(54) GENERATING SOFTWARE COMPONENTS FROM BUSINESS RULES EXPRESSED IN A NATURAL LANGUAGE

(75) Inventors: Donald Edward Baisley, Laguna Hills, CA (US); Ravi Anthony Joseph Dirckze, Mission Viejo, CA (US)

(73) Assignee: Microsoft Corporation, Redmond, WA (US)

( * ) Notice: Subject to any disclaimer, the term of this patent is extended or adjusted under 35 U.S.C. 154(b) by 1623 days.

(21) Appl. No.: 10/903,452

(22) Filed: Jul. 30, 2004

(65) Prior Publication Data

US 2006/0025987 A1  Feb. 2, 2006

(51) Int. Cl.
  *G06F 17/27*  (2006.01)
  *G06F 17/21*  (2006.01)
  *G06F 9/44*  (2006.01)
(52) U.S. Cl. ............... 704/9; 704/10; 717/102
(58) Field of Classification Search .......... 704/4, 7, 704/9, 10
  See application file for complete search history.

(56) References Cited

U.S. PATENT DOCUMENTS

| 4,974,191 | A |   | 11/1990 | Amirghodsi |
| 5,167,009 | A |   | 11/1992 | Skeirik |
| 5,197,005 | A |   | 3/1993 | Schwartz |
| 5,495,604 | A | * | 2/1996 | Harding et al. ............ 707/690 |
| 5,590,322 | A | * | 12/1996 | Harding et al. .................... 1/1 |
| 5,592,668 | A | * | 1/1997 | Harding et al. .................... 1/1 |
| 5,634,024 | A |   | 5/1997 | Yamaguchi |
| 5,748,974 | A |   | 5/1998 | Johnson |
| 5,907,840 | A |   | 5/1999 | Evans |
| 5,953,526 | A |   | 9/1999 | Day |
| 6,016,467 | A |   | 1/2000 | Newsted |
| 6,023,669 | A |   | 2/2000 | Suda |
| 6,173,441 | B1 |   | 1/2001 | Klein |
| 6,460,043 | B1 | * | 10/2002 | Tabbara et al. ............. 707/100 |
| 6,523,172 | B1 | * | 2/2003 | Martinez-Guerra et al. . 717/143 |
| 6,587,849 | B1 |   | 7/2003 | Mason |
| 6,618,732 | B1 | * | 9/2003 | White et al. ............ 707/103 R |
| 6,640,207 | B2 |   | 10/2003 | Witschel |
| 6,735,592 | B1 | * | 5/2004 | Neumann et al. .................... 1/1 |
| 6,763,341 | B2 |   | 7/2004 | Okude |
| 6,789,252 | B1 | * | 9/2004 | Burke et al. ................. 717/100 |

(Continued)

OTHER PUBLICATIONS

Terry Halpin, Information Modeling and Relational Databases from Conceptual Analysis to Logical Design, pp. 412-454, Morgan Kaufmann Publishers, 2001.

(Continued)

*Primary Examiner* — Richemond Dorvil
*Assistant Examiner* — Olujimi A Adesanya
(74) *Attorney, Agent, or Firm* — Workman Nydegger

(57) ABSTRACT

An embodiment of the present invention is a method for generating software components from one or more business rule statements expressed in a language. Symbols of a vocabulary of a language and business rule statements expressed using the symbols of the vocabulary of the language are received as input. The language has grammatical rules. Each of the business rule statements is parsed in accordance with the grammatical rules to generate a language-based structure. The language-based structure is processed to generate an expression model. The expression model is processed to generate a logical model. The logical model is processed to generate platform-independent implementation model in response to a user request for such generation. A target platform description is received. The platform-independent implementation model is processed to generate a platform-specific implementation model using the target platform description. Software components are generated from the platform-specific implementation model for deployment.

33 Claims, 8 Drawing Sheets

U.S. PATENT DOCUMENTS

| | | | |
|---|---|---|---|
| 6,829,603 B1* | 12/2004 | Wolf et al. ............................ 707/5 |
| 7,020,869 B2 | 3/2006 | Abrari |
| 7,131,110 B2* | 10/2006 | Brewin ............................ 717/108 |
| 7,185,016 B1 | 2/2007 | Rasmussen |
| 7,233,915 B2 | 6/2007 | Metcalfe |
| 7,257,579 B2* | 8/2007 | Wachholz-Prill ................. 707/9 |
| 7,356,522 B2 | 4/2008 | Herrera |
| 7,499,850 B1* | 3/2009 | Neubauer et al. ................. 704/9 |
| 7,523,133 B2* | 4/2009 | Mackie ....................... 707/104.1 |
| 7,606,782 B2 | 10/2009 | Haley |
| 7,613,666 B1* | 11/2009 | Baisley ............................ 706/20 |
| 7,613,676 B2* | 11/2009 | Baisley et al. ................... 706/57 |
| 2002/0107889 A1 | 8/2002 | Stone |
| 2003/0046061 A1 | 3/2003 | Preston |
| 2003/0097363 A1 | 5/2003 | Dorsey |
| 2003/0216919 A1 | 11/2003 | Roushar |
| 2004/0030421 A1 | 2/2004 | Haley |
| 2004/0210445 A1* | 10/2004 | Veronese et al. ................... 705/1 |
| 2005/0096908 A1 | 5/2005 | Bacchiani |
| 2005/0108001 A1 | 5/2005 | Aarskog |
| 2005/0177817 A1 | 8/2005 | Arcaro |
| 2005/0246157 A1 | 11/2005 | Baisley |
| 2005/0246371 A1 | 11/2005 | Baisley |
| 2005/0289560 A1 | 12/2005 | Sedogbo |
| 2006/0026576 A1 | 2/2006 | Basley |

OTHER PUBLICATIONS

Bryant et al., From Natural Language Requirements to Executable Models of Software Components, Sep. 24, 2003, 8 pages.

Donald Baisley and Peter Cunnningham, Business Transformation Utilizing Business Rule Technologies, Dec. 2, 2003, 18 pages.

L. Mich et al, NL-OOPs: A Requirements Analysis Tool Based on Natural Language Processing, 2002, 11 pages.

Perex-Gonzales et al. "GOOAL: A Graphic Object Oriented Analysis Laboratory" Nov. 2002, AMC OOPSLA '02, pp. 38-39.

Evans "A Comparison of Tule-Based and Machine Learning Methods for Identifying Non-Normal It", 2000, NPL 2000, LNCS 1835, pp. 233-240.

Office Action dated Dec. 6, 2007 cited in related U.S. Appl. No. 10/860,672.

Office Action dated Dec. 12, 2007 cited in related U.S. Appl. No. 10/837,299.

Office Action dated Oct. 19, 2007 cited in related U.S. Appl. No. 10/899,891.

Office Action dated Jun. 27, 2008 cited in related U.S. Appl. No. 10/899,891.

Office Action dated Oct. 3, 2008 cited in U.S. Appl. No. 10/837,299.

Office Action dated Oct. 5, 2007 cited in U.S. Appl. No. 10/831,679.

Office Action dated Jul. 10, 2008 cited in U.S. Appl. No. 10/831,679.

Terry Halpin, Information modeling and Relational Database from Conceptual Analysis to Logical Design, pp. 412-454, Moragan Kaufmann Publishers, 2001.

Office Action dated Dec. 16, 2008 cited in U.S. Appl. No. 10/831,679.

Office Action dated Jan. 7, 2009 cited in U.S. Appl. No. 10/899,891.

Notice of Allowance dated Apr. 3, 2009 cited in U.S. Appl. No. 10/837,299.

Notice of Allowance dated Oct. 28, 2008 cited in U.S. Appl. No. 10/860,672.

Halpin, "Object Role Modeling: An Overview", Microsoft White Paper, Nov. 2001, Available at: http://msdn.microsoft.com/en-us/library/aa290383.aspx.

Notice of Allowance dated Jun. 25, 2009 cited in U.S. Appl. No. 10/831,679.

Notice of Allowance dated Jul. 7, 2009 cited in U.S. Appl. No. 10/837,299.

Notice of Allowance dated Jul. 10, 2009 cited in U.S. Appl. No. 10/899,891.

Office Action dated Jan. 29, 2010 cited in U.S. Appl. No. 10/836,832.

U.S. Appl. No. 10/836,832, Mail Date Jun. 28, 2010, Notice of Allowance.

\* cited by examiner

GENERATING SOFTWARE COMPONENTS FROM BUSINESS RULES EXPRESSED IN A NATURAL LANGUAGE

CROSS-REFERENCE TO RELATED APPLICATIONS

This application is related to the following patent applications: Ser. No. 10/836,832 (now issued U.S. Pat. No. 7,802,231) entitled "Generating Programmatic Interfaces From Natural Language Expressions Of Authorizations For Provision Of Information", filed on Apr. 30, 2004; Ser. No. 10/837,299 (now issued U.S. Pat. No. 7,620,935) entitled "Generating Programmatic Interfaces From Natural Language Expressions Of Authorizations For Request Of Information", filed on Apr. 30, 2004; Ser. No. 10/860,672 (now issued U.S. Pat. No. 7,499,850) entitled "Generating A Logical Model Of Objects From A Representation Of Linguistic Concepts For Use In Software Model Generation", filed on Jun. 3, 2004; and Ser. No. 10/899,891 (now issued U.S. Pat. No. 7,613,676) entitled "Generating A Database Model From Natural Language Expressions Of Business Rules", filed on Jul. 27, 2004; all assigned to the same assignee as the present application, the contents of each of which are herein incorporated by reference.

BACKGROUND

1. Field of the Invention

Embodiments of the invention relate to generation of software components from business rules expressed in natural language.

2. Description of Related Art

Natural language used by humans to communicate tends to be contextual and imprecise. To automate natural language processing using computerized methods, certain rules are usually imposed to confine the natural language expressions to a well-defined format. There are several applications that can provide an environment where natural language expressions may be expressed in an unambiguous format. One such application is business language. Business language can be used to describe a business organization and the business rules that are applicable to the business organization.

There are existing tools that help business people build formal business vocabularies. There are techniques developed by linguists for parsing well formed natural language statements into structures that represent the statements in terms of formal logics. There are various software-based approaches that assist people in moving from business requirements stated in business language into software designs, and from designs to implemented systems.

For example, there are well documented techniques for generating a relational data model from a logical model of concepts and fact types, such as the techniques described in "Information Modeling and Relational Databases From Conceptual Analysis to Logical Design", pages 412-454, by Terry Halpin, Morgan Kaufmann Publishers, 2001. Examples of implementations of such generation are provided by database development tools such as Microsoft Visio (with Object Role Modeling) and InfoModeler of Asymetrix Corporation.

For example, there are software tools that perform automated generation of an execution model from a logical model. Examples of such software tools include the product LINC from Unisys Corporation, ActiveQuery tool from Visio Corporation and Internet Business Logic from Reengineering LLC.

However, these existing techniques only support some parts, but not all, of the transformation from business rules expressed in a natural language to software components. Currently, there does not exist a technique to provide an integrated system for automatically generating software components and databases from business rules expressed in a natural language.

SUMMARY OF THE INVENTION

An embodiment of the present invention is a method for generating software components from one or more business rule statements expressed in a language. Symbols of a vocabulary of a language and rule statements expressed using the symbols of the vocabulary of the language are received as input. The language has grammatical rules. Each of the business rule statements is parsed in accordance with the grammatical rules to generate a language-based structure. The language-based structure is processed to generate an expression model. The expression model is processed to generate a logical model. The logical model is processed to generate platform-independent implementation model in response to a user request for such generation. A target platform description is received. The platform-independent implementation model is processed to generate a platform-specific implementation model using the target platform description. Software components are generated from the platform-specific implementation model for deployment.

BRIEF DESCRIPTION OF THE DRAWINGS

The invention may best be understood by referring to the following description and accompanying drawings that are used to illustrate embodiments of the invention.
In the drawings.

DESCRIPTION

Figure 1:
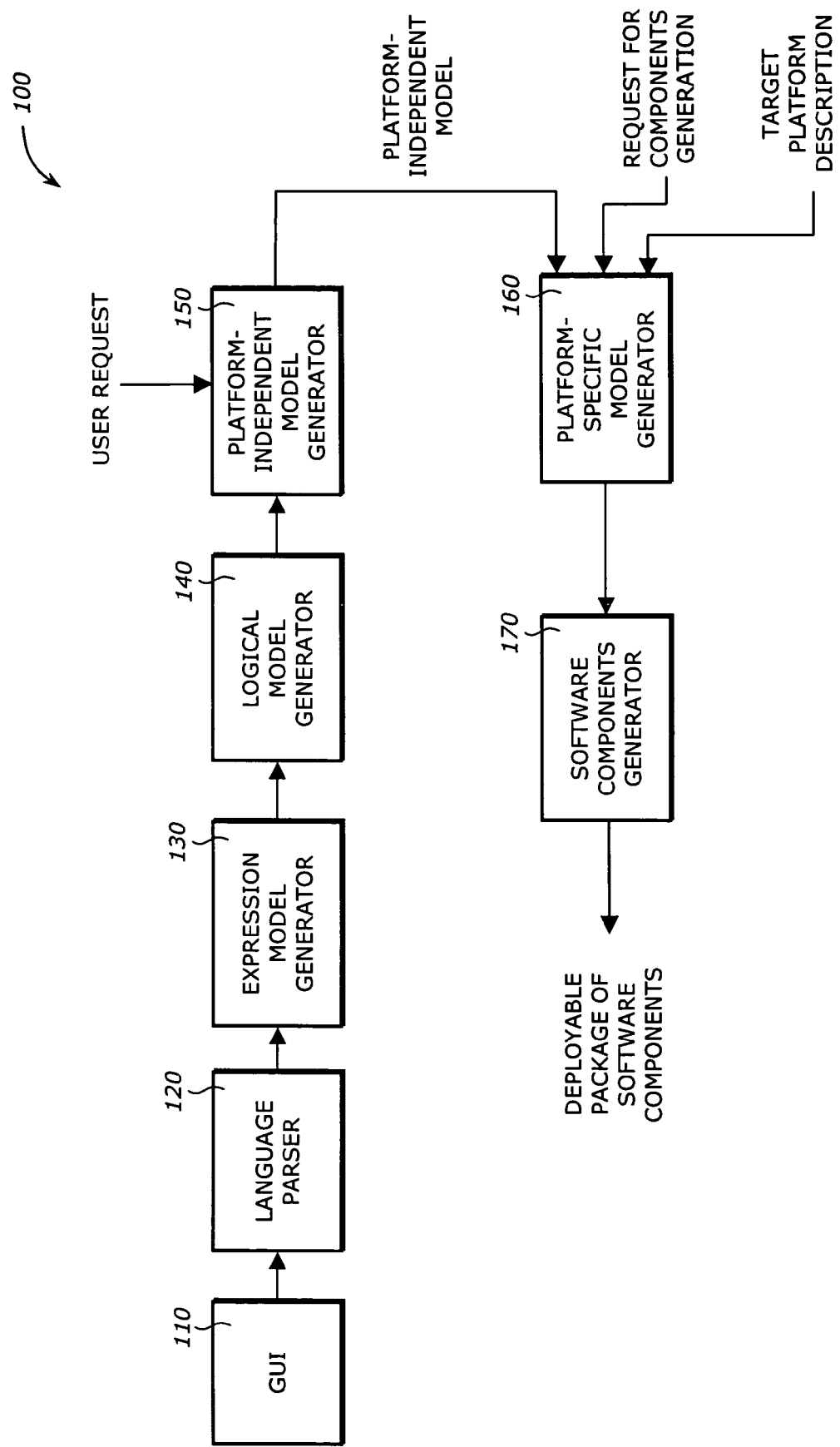
FIG. 1 is a diagram illustrating an embodiment 100 of the system of the present invention.

An embodiment of the present invention is a method for generating software components from one or more business rule statements expressed in a language. Symbols of a vocabulary of a language and business rule statements expressed using the symbols of the vocabulary of the language are received as input. The language has grammatical rules. Each of the business rule statements is parsed in accordance with the grammatical rules to generate a language-based structure. The language-based structure is processed to generate an expression model. The expression model is processed to generate a logical model. The logical model is processed to generate platform-independent implementation model in response to a user request for such generation. A target platform description is received. The platform-independent implementation model is processed to generate a platform-specific implementation model using the target platform description. Software components are generated from the platform-specific implementation model for deployment.

The use of the present invention allows business people to use their business language, not a programming language, in stating business rules. Business rules are stated as declarative statements of what a business requires, not as procedural instructions or steps performed in a process. The present invention supports business rules stated in any natural language (e.g., English, French, German, etc.).

Embodiments of the present invention allow software components and databases to be generated from business rules without requiring any action from a human programmer.

In one embodiment of the present invention, business rules are automatically checked for logical consistency so that business people are assisted in writing correct and useful business rules as input to the system.

One embodiment of the present invention provides a multi-tier architecture where data and logic are in separate tiers.

In the following description, numerous specific details are set forth. However, it is understood that embodiments of the invention may be practiced without these specific details. In other instances, well-known circuits, structures, and techniques have not been shown in order not to obscure the understanding of this description.

Many relevant linguistic concepts are used in the following description. These concepts are developed using a linguistic terminology that includes a number of terms. These terms include "expression", "nominal expression", "term", "name", "numerical literal", "textual literal", "role expression", "sentence", "simple sentence", "complex sentence", "function form", "sentence form", "parametric operator", "interrogative operator", "propositional interrogative", "identification scheme", "type", "category", "role", "supertype", and "subtype".

An expression is a symbol or combination of symbols that means something. The meaning can be anything, including a proposition, a rule, a number, etc.

A nominal expression is an expression that names a thing or things.

A symbol is something representing, in the sense of meaning, something else.

A term is a symbol that denotes being of a type, i.e., a common noun.

Examples: "car" denoting a category of vehicle; "bank account".

A name is a symbol and a nominal expression; a symbol that names an individual thing, i.e., a proper noun.

Examples: "California" naming a state of the United States; "Unisys" naming the company Unisys.

A numerical literal is a name that denotes a number using numerals.

Example: "123" meaning the number 123.

A textual literal is a symbol and a nominal expression; a symbol that represents words, punctuation, textual characters or a sequence of any of these by literal presentation, as in quotation marks.

Example: "hello" representing the word "hello".

A role expression is a nominal expression that consists primarily of a term given in place of a placeholder in an expression based on a function form, and consists secondarily of an operator (e.g., quantifier, pronominal operator, parametric operator, interrogative operator) and an object modifier applied to the term together with any expression of instances specifically referenced by the term, or, if the denoted type's range is restricted using a nominal restrictive form, that nominal restrictive form along with the expression of each argument to the function delineated by that form.

Examples: "a checking account" in the expression "a checking account has the overdraw limit ($1000.00)"; "the overdraw limit ($1000.00)" in the expression "a checking account has the overdraw limit ($1000.00)".

A mathematical expression is a category of nominal expression. It is stated using a mathematical form and includes a nominal expression for each placeholder of the mathematical form.

A sentence is an expression that denotes a proposition (possibly an open or interrogative proposition).

A simple sentence is a sentence that is stated using a single sentence form, that is, with no logical connectives. It includes a nominal expression for each placeholder' of the sentence form. Example: "Each person has a name".

A complex sentence is a sentence that combines other sentences using a logical connective such as "if", "and", "or", etc.

Example: "Each American citizen has a name and a social security number".

A function form is a symbol and an expression; a complex symbol that is a sequence of typed placeholders and words interspersed that delineates a function and serves as a form for invoking the function in expressions. Each typed placeholder appears in the sequence as a term denoting the placeholder's type specially marked in some way (such as by underlining).

A nominal restrictive form is a category of function form. It is a function form that can be the form of a nominal expression and that includes a placeholder representing the function result of the delineated function.

Examples: "doctor of patient" as form of expressing the doctor or doctors that a patient has; "patient seen by doctor" as form of expressing the patients that a doctor sees.

A mathematical form is a category of function form. It is a function form that can be the form of a nominal expression and that does not include a placeholder representing the function result of the delineated function.

Examples: "number+number" as in "2+3" giving 5; "number of days after date" as in "6 days after Dec. 25, 2003" giving another date.

A sentence form is a category of function form that delineates a propositional function. Example: "vendor charges price for product".

A function signifier is a role of a signifier as part of a function form that appears in an expression based on the function form. It is a part of a function form that is not a placeholder.

Examples: "sees" in "doctor sees patient"; "changes" and "for" in "vendor changes price for product"

A placeholder is an open position with a designated type in a function form that stands in place of a nominal expression that would appear in an expression based on that form. A placeholder represents an argument or a result in the function delineated by the functional form.

Examples: doctor and patient in "doctor sees patient"; vendor, price and product in "vendor changes price for product"

An argument is an independent variable in a function.

An object qualifier is a category of symbol. It is a symbol that, when used with a term, restricts the meaning of the term in some specific way.

Example: the symbol "new" in "A doctor sees a new patient"

A parametric operator is an operator that when expressed with a term denotes a discourse referent determined by future discourse context, with singular quantification.

Example: "a given" in "Each medical receptionist is authorized to provide what doctor sees a given patient".

An interrogative operator is a category of operator that, when expressed with a term in a role expression, denotes a discourse referent determined by future discourse context. The role expression is thus a name for satisfiers in the encompassing sentence.

Examples: the operator "what" in "What doctor sees what patient"; the operators "which" and "what" in "Which doctor sees what patient".

Note that "what" carries the meaning of "who", "when", "how", "where", "why", etc. when used as an operator on a term. Examples: "what person", "what time" or "what date", "what method", "what location", "what purpose", etc.

A propositional interrogative is a category of operator. It is an operator that, when expressed with a proposition, denotes the truth-value of the proposition with regard to future discourse context.

Example: the operator "whether" in "whether each doctor is licensed".

A propositional demonstrative is a category of symbol. It is a symbol that names a referent proposition thereby forming a demonstrative expression.

Examples: the word "that" in "The Orange County Register reports that Arnold is running"; the word "who" in "A customer who pays cash gets a discount"

Note: the propositional demonstrative turns a sentence into a nominal expression.

A pronominal operator is a category of operator. It is an operator that, when expressed with a term, denotes a discourse referent determined by discourse context and has universal extension.

EXAMPLES:

the word "the" in "a person is French if the person is from France".

the word "that" in "a person is French if that person is from France".

the word "the" in "the social security number of a person identifies the person".

Note that a pronominal operator refers to something in discourse or immediately to some attributive role, and invokes universal quantification over each value of the referent.

A discourse context is a discourse that surrounds a language unit and helps to determine its interpretation.

Example: In the rule expression, "By default, a monthly service charge ($1.95) applies to an account if the account is active", the role expression "the account" is interpreted in consideration of every other symbol in the rule expression, and is thereby mapped to the referent expressed as "an account".

Note that discourse context is the means by which the pronominal operator "the" gets meaning. Discourse context is linear, therefore, references tend to refer backwards.

A function is a mapping of correspondence between two sets.

Examples: number+number (Addition)
name of person

A propositional function is a category of function. It is a function that maps to truth values.

Examples: the function delineated by "vendor sells product"; the function delineated by "customer is preferred"

A proposition is what is meant by a statement that might be true of false.

A fact is a proposition that is accepted as true.

An elementary proposition is a category of proposition. It is a proposition based on a single propositional function and a single thing for each argument of the function (no quantified arguments, no open arguments).

An elementary fact is a fact that is also an elementary proposition.

An elementary fact type is a category of type. It is a subtype of elementary fact that is defined by a propositional function.

Examples: the type defined by the propositional function delineated by "vendor sells product".

A fact type is a type that is a classification of facts. A fact type may be represented by a form of expression such as a sentence form, restrictive form or a mathematical form. A fact type has one or more roles, each of which is represented by a placeholder in a sentence form. Each instance of a fact type is a fact that involves one thing for each role. Example: a fact type 'person drives car' has placeholders person and car. An instance of the fact type is a fact that a particular person drives a particular car.

An operator is a symbol that invokes a function on a function.

Examples: some, each
definitely, possibly

A logical connective is a symbol that invokes a function on truth values.

Examples: and, or
if, only if, if and only if
given that
implies

A quantifier is a category of operator. It is an operator that invokes a quantification function, a linguistic form that expresses a contrast in quantity, as "some", "all", or "many".

Examples: some, each, at most one, exactly one, no.

Note that a quantifier for an individual quantification function should not be confused with a name for such a function. A quantifier is not a noun or noun phrase, but an operator. For example, the quantifier "some" is a symbol that invokes the quantification function named "Existential Quantification".

A quantification function is a category of function. It is a function that compares the individuals that satisfy an argument to the individuals that satisfy a proposition containing that argument.

Examples: the meaning of "some" in "Some person buys some product";
the meaning of "each" in "Each person is human"

An existential quantification is the instance of quantification function that is satisfied where at least one individual that satisfies an argument also satisfies a proposition containing that argument.

Examples: the meaning of "some" in "Some customer pays cash".

the meaning of "a" in "Each customer buys a product"

A universal quantification is the instance of quantification function that is satisfied if every individual that satisfies an argument also satisfies a proposition containing that argument.

Examples: the meaning of "each" in "Each customer buys a product"

A singular quantification is the instance of quantification function that is satisfied if exactly one individual that satisfies an argument also satisfies a proposition containing that argument.

Example: the meaning of "exactly one" in "Each employee has exactly one employee number"

A negative quantification is the instance of quantification function that is satisfied if no individual that satisfies an argument also satisfies a proposition containing that argument.

Example: the meaning of "no" in "No customer buys a product"

A rule is an authoritative, prescribed direction for conduct. For example, one of the regulations governing procedure in a legislative body or a regulation observed by the players in a game, sport, or contest.

Examples: see categories of rule

Note that a rule is not merely a proposition with a performative of Prescription or Assertion. A rule is made a rule by some authority. It occurs by a deliberate act.

An assertion rule is a category of rule, a rule that asserts the truth of a proposition.

Examples: Each terminologist is authorized to provide what meaning is denoted by a given signifier; Each customer is a person A constraint rule is a category of rule, a rule that stipulates a requirement or prohibition.

Examples: It is required that each term has a exactly one signifier;

It is permitted that a person drives a car on a public road only if the person has a driver's license;

It is prohibited that a judge takes a bribe.

A default rule is a category of rule, a rule that asserts facts of some elementary fact type on the condition that no fact of the type is otherwise or more specifically known about a subject or combination of subjects.

Examples: By default, the shipping address of a customer is the business address of the customer.

By default, the monthly service charge ($1.95) applies to an account if the account is active.

Note that a default rule is stated in terms of a single propositional function, possibly indirectly using a nominal restrictive form based on the propositional function. A default value is given for one argument. The other arguments are either universally quantified or are related to a condition of the rule. For each combination of possible things in the other arguments, if there is no elementary fact that is otherwise or more specifically known, and if the condition (if given) is satisfied, then the proposition involving those arguments is taken as an assertion.

Note that if two default rules potentially assert facts of the same elementary fact type about the same subject thing and one of the rules is stated for a more specific type of the thing, then that rule is used (because it is more specifically stated).

An identity criterion, also called identification scheme or reference scheme, is a scheme by which a thing of some type can be identified by facts about the thing that relate the thing to signifiers or to other things identified by signifiers. The identifying scheme comprises of the set of terms that correspond to the signifiers.

Example: an employee may be identified by employee number.

A type is a classification of things (often by category or by role).

A category is a role of a type in a categorization relation to a more general type. The category classifies a subset of the instances of the more general type based on some delimiting characteristic.

Example: checking account is a category of account.

A role is a role of a type whose essential characteristic is that its instances play some part, or are put to some use, in some situation. The type classifies an instance based, not on a distinguishing characteristic of the instance itself (as with a category), but on some fact that involves the instance.

Example: destination city is a role of a city.

A supertype is a role of a type used in relation to another type such that the other type is a category or role of the supertype, directly or indirectly. Each instance of the other type is an instance of the supertype.

Examples: animal is a supertype of person (assuming person is a category of animal) and person is a supertype of driver (assuming driver is a role of a person).

A subtype is a role of a type used in relation to another type such that the subtype is a category or role of the other type, directly or indirectly. Each instance of the subtype is an instance of the other type. This is the inverse of supertype.

Examples: person is a subtype of animal (assuming person is a category of animal) and driver is a subtype of person (assuming driver is a role of a person).

In one embodiment, the invention is implemented using an object-oriented technique. The object-oriented technique is a method to represent a system using objects and associations between objects. The technique involves the use of "class", "association", "attribute". Although these terms are commonly known, they are defined in the following for clarification.

A class is an abstract concept representing a real world thing of interest to the system, such as a person, a router in a network, etc. A class is a template that defines the behavior and attributes that a particular type of object possesses. A class can be the base for other classes. The behavior of the object is the collective set of operations that the object can perform, which are defined in the respective class. The state of the object is defined by the values of its attributes at any given time.

An association represents a relationship between objects.

An attribute represents some aspect of an object. For example, the color of an automobile, the date of birth of a person. Each attribute has a type that defines the range of values that the attribute can have.

FIG. 1 is a diagram illustrating an embodiment 100 of the system of the present invention. The system 100 comprises an optional graphic user interface 110, a language parser 120, an expression model generator 130, a logical model generator 140, a platform-independent implementation model generator 150, a platform-specific implementation model generator 160 and a software components generator 170. The system 100 may be implemented by software or hardware, or a combination of hardware and software.

The optional graphical user interface 110 receives as input a set of symbols of a language given as a vocabulary, details about each of these symbols, and a set of rule statements expressed with the vocabulary. Details about each of the symbols may include synonymy (that is, symbols representing the same concept), generalization relationships between the terms, relationships between names of individual things and terms for the types of those things, and identity criteria. The identity criteria, also called reference schemes or identification schemes, are specified as names of properties that are used to identify things denoted by a term. The rule statements are in a linguistic form having a predefined syntax or format. A rule statement may represent an authorization to request or to provide information. The graphical user interface 110 passes what it receives as input to the language parser 120. The graphical user interface 110 is optional since the vocabulary and the rule statements can be inputted directly to the language parser 120 under other forms, e.g., as XML documents, or word processing documents, or as output from a business rule repository. The use of the graphical user interface 110 allows a user and the language parser 120 to receive feedback from the logical model generator 140 in order to assist the user in writing better rule statements and to help resolve any logical inconsistencies in the rule statements.

The language parser 120 receives as input the set of symbols of a natural language, information regarding the symbols, and the set of rule statements expressed using the set of symbols. The structure of each of the rule statements is dictated by the grammatical rules of the language. The language parser 120 parses each of the rule statements in accordance with the grammatical rules of the language and outputs a language-based structure that identifies the symbols used and their interrelationships with respect to the sentence structure. The language parser 120 reports how words in each statement are categorized into the following categories:

a. Terms defined in the vocabulary;

b. Names defined in the vocabulary for individual things;

c. Connecting symbols of function forms defined in the vocabulary;

d. Key words and phrases such as articles (e.g., "a", "an" and "the"), quantifiers (e.g., "each" and "some"), and logical connectives (e.g., "and", "or", "if");

e. Words that are not recognized.

The language parser 120 also reports where rule statements fail to conform to the grammatical rules of the language.

The expression model generator 130 receives as input the language-based structure of each rule statement and generates a language-neutral expression model that represents the expression of each rule statement independently of the ordering of symbols or of the grammatical structure. The expression model generator 130 outputs the language-neutral expression model as packages of elements representing linguistic concepts. The language-neutral expression model provides a representation of logical relationships in terms of symbols from the vocabulary. The expression model generator 130 functions may include some or all the tasks described herein in connection with generating an expression model in terms of processes.

The logical model generator 140 receives as input the packages of elements representing specifications of the rule statements in terms of linguistic concepts and generates a logical model that represents the semantics of each of the rule statements in terms of formal logics. The logical model provides a representation of logical relationships in terms of concepts that are represented by the symbols of the vocabulary. The logical model generator 140 functions may include some or all the tasks described herein in connection with generating a logical model in terms of processes.

In creating the logical model, the logical model generator 140 performs the following operations:

a. Relating synonymous terms to a single concept;

b. Relating synonymous forms and related noun forms to a single fact type;

c. Relating synonymous names to a single instance;

d. Relating each instance to its corresponding concept;

e. Determining identifying fact types for concepts;

f. Determining generalizations between concepts;

g. Reporting logical inconsistencies, if any.

Upon receipt of a user request, but only if there are no logical inconsistencies, the platform-independent implementation model generator 150 generates a platform-independent implementation model in three parts: (a) a component interface model, (b) a database model, and (c) an execution model.

Upon receipt of a user request for component generation, the platform-specific implementation model generator 160 accepts, as input, a description of a target platform that includes:

a. A specific component interface technology (e.g., .NET, SOAP, J2EE, etc.)

b. A specific database system (e.g., SQL Server, Oracle)

c. A specific programming platform (e.g., .NET, J2EE, COBOL, etc.)

From the platform-independent implementation model and the description of the target platform, the software components generator 170 generates a corresponding platform-specific implementation model for the specified target platform.

From the platform-specific implementation model, the components generator 170 generates software components and assembles them into a package of software components that is deployable on the specified target platform.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. A loop or iterations in a flowchart may be described by a single iteration. It is understood that a loop index or loop indices or counter or counters are maintained to update the associated counters or pointers. In addition, the order of the operations may be re-arranged. A process terminates when its operations are completed. A process may recursively call itself. When the called process terminates, control is returned to the calling process. When all the recursive calls have ended, control is returned to the initial calling process. A process may correspond to a method, a program, a procedure, etc.

Figure 2:
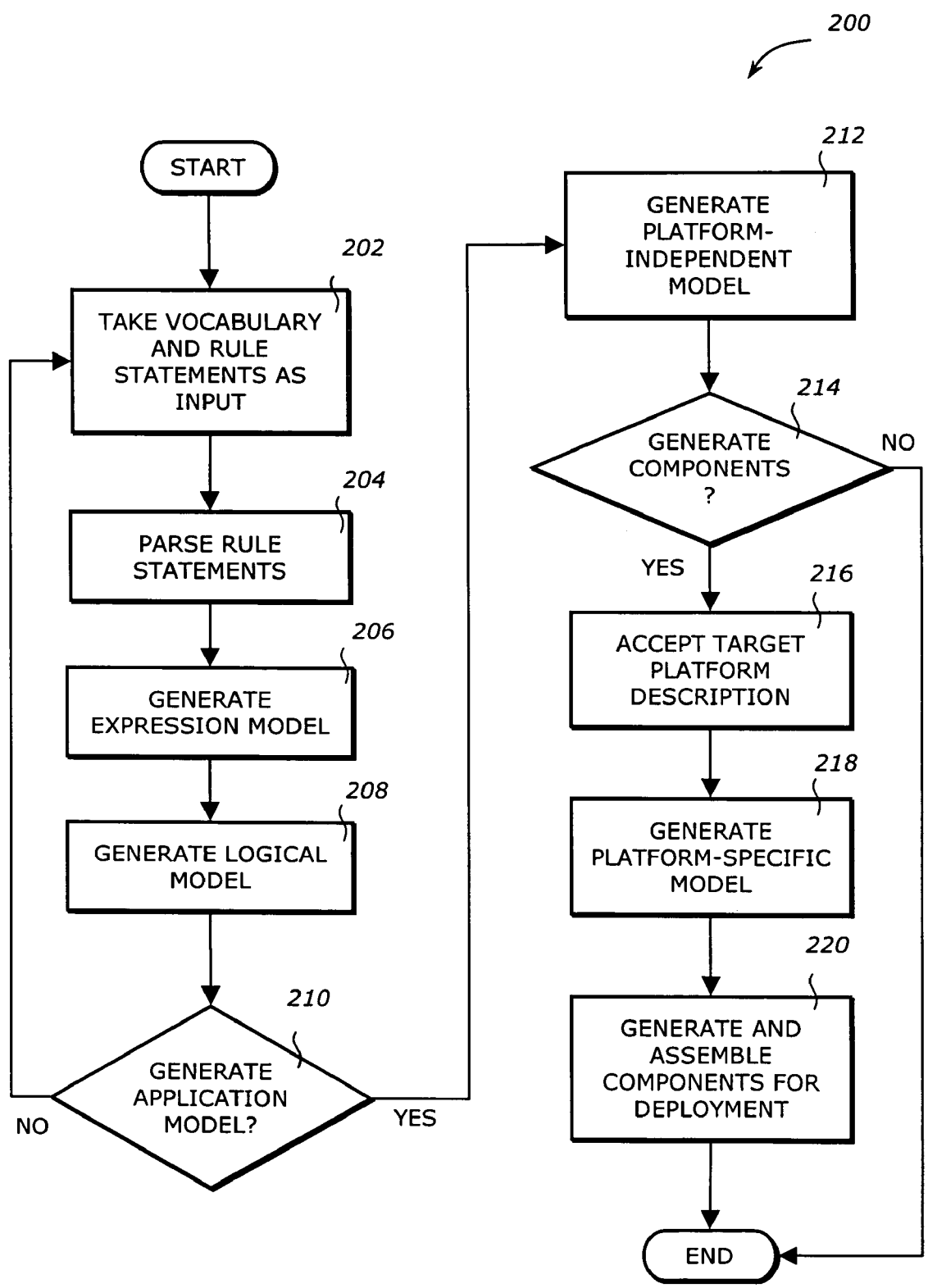
FIG. 2 is a flowchart illustrating a process 200 for generating deployable software components from business rules expressed in a natural language.

FIG. 2 is a flowchart illustrating a process 200 for generating deployable software components from business rules expressed in a natural language.

Upon Start, process 200 receives a vocabulary and rule statements as input (block 202). Textual input may be provided via any of well known ways such as the following: (a) a custom user interface; (b) XML documents; (c) Word processing documents (e.g., Microsoft Word); (d) output from a business rule repository (such as Rule Track from Business Rules Solutions).

The input of the vocabulary is structured in order to distinguish one symbol from another and to indicate the properties of each symbol. Business rules are given as textual statements that have been written according to the grammatical rules of the language being used. Business rules must be precise and must be stated using the given vocabulary.

Process 200 parses the rule statements to generate a language-based structure (block 204). Grammatical structure of each of the rule statements is determined based on the grammatical rules of the language being used. Symbols used in the statement of each business rule are matched to symbols of the given vocabulary.

Automated parsing of natural language is a well-known discipline as exemplified by existing tools such as the Microsoft grammar checker that is part of Microsoft Word.

Process 200 then generates an expression model from the language-based structure resulting from the parsing operation (block 206). The expression model represents the same information as the language-based structure except that the ordering of symbols and the grammatical structure are omitted and logical operations such as quantification, conjunction, disjunction, implication, etc. are identified and replaced by corresponding equivalents in formal logics. In addition, rules are identified as being either assertions or requirements. The expression model refers to the actual symbols used to express the rules, but does so without consideration of the characteristics of the language. Thus, the expression model is language-neutral.

This transformation involves straightforward substitution of grammatical elements with formal logics elements and is easily accomplished by anyone skilled in the art of programming with data structures. For example, an operator such as "and" is replaced by a model element representing logical conjunction, and a quantifier such as "some" is replaced by a model element representing existential quantification. Note that operators and quantifiers have already been identified as such in the language-based structure, so the transformation is straightforward.

Next, process 200 generates a logical model from the expression model (block 208). The logical model represents concepts rather than symbols. Rules are represented at a conceptual level in terms of logical operations and concepts. There can be many terms for the same concept. The expression model refers to terms, while the logical model refers to the concepts that are represented by those terms. The expression model refers to sentence forms, while the logical model refers to fact types that are represented by the sentence forms.

Each generalization between concepts (where one concept is a specialization of another) is determined transitively. Identity criteria are represented as relationships between concepts, that is, types of facts about individuals in the extension of a concept.

A technique for processing the expression model to generate a logical model is described in detail in the co-pending application Ser. No. 10/860,672 entitled "Generating A Logical Model Of Objects From A Representation Of Linguistic Concepts For Use In Software Model Generation", filed on Jun. 3, 2004.

After generating the logical model, process 200 checks whether there is a user request to generate an application model, i.e., a model of an automated implementation of the business rules (block 210). If there is no such request, process 200 goes back to block 202. Otherwise, if there is such request, but only if the logical model has no logical inconsistencies, process 200 generates a model of an automated implementation of the business rules (block 212). This model is platform-independent, meaning that it is independent of any particular type of computer platform, computer language or system software. For example, the same platform-independent model is equally applicable on a Windows machine using .NET and C# or on a Sun Microsystems machine using J2EE and Java.

In one embodiment of the invention, the platform-independent implementation model has three parts:
1. Component interface model, which is an object-oriented interface model
2. Database model, which is a relational information model
3. Execution model, which is a method of execution represented as logical steps and relational operations Embodiments of the technique for generating the component interface model (the first part of the platform-independent implementation model) from business rules that state authorizations to request or to provide information are described in the co-pending patent application Ser. No. 10/836,832 entitled "Generating Programmatic Interfaces From Natural Language Expressions Of Authorizations For Provision Of Information", filed on Apr. 30, 2004 and Ser. No. 10/837,299 entitled "Generating Programmatic Interfaces From Natural Language Expressions Of Authorizations For Request Of Information", filed on Apr. 30, 2004.

There are well documented techniques for generating a relational data model (the second part of the platform-independent implementation model) from a logical model of concepts and fact types, such as the techniques described in "*Information Modeling and Relational Databases From Conceptual Analysis to Logical Design*", pages 412-454, by Terry Halpin, Morgan Kaufmann Publishers, 2001. Examples of implementations of this generation are provided by database development tools such as Microsoft Visio (with Object Role Modeling) and InfoModeler of Asymetrix Corporation.

In addition, a new technique for generating a database model from business rules represented by logical concepts and fact types is described in detail in the co-pending application Ser. No. 10/899,891 entitled "Generating A Database Model From Natural Language Expressions Of Business Rules", filed on Jul. 27, 2004.

The automated generation of an execution model (the third part of the platform-independent implementation model) from a logical model is well understood and widely practiced. Examples of software tools that perform such generation include LINC from Unisys Corporation, ActiveQuery tool from Visio Corporation and Internet Business Logic from Reengineering LLC.

After generating the platform-independent implementation model, process 200 checks whether there is a user request to generate software components deployable on a target platform (block 214). If there is no such request, process 200 terminates. Otherwise, process 200 accepts, as input, a description of a target platform (block 216).

A target platform is specified as follows:
a. A specific component interface technology (e.g. .NET, SOAP, J2EE, etc.)
b. A specific database system (e.g. SQL Server, Oracle)
c. A specific programming platform (e.g. .NET, J2EE, COBOL, etc.)

Process 200 then transforms the platform-independent implementation model into a platform-specific implementation model that uses the features of the target platform, middleware, database system and programming language (block 218).

Automation of this type of transformation is widely understood and is performed by numerous software development tools, such as the product LINC of Unisys Corporation and the product ArcStyler of the company Interactive Objects.

From the platform-specific implementation model, process 200 generates software components and assembles them into a deployable package (block 220). Generation of software components into a deployable package from well-formed models of interfaces, component execution and database has been a pervasive aspect of case tools and high-level programming systems for many years. For example, the Unisys LINC product has been performing such generation for many years.

Figure 3:
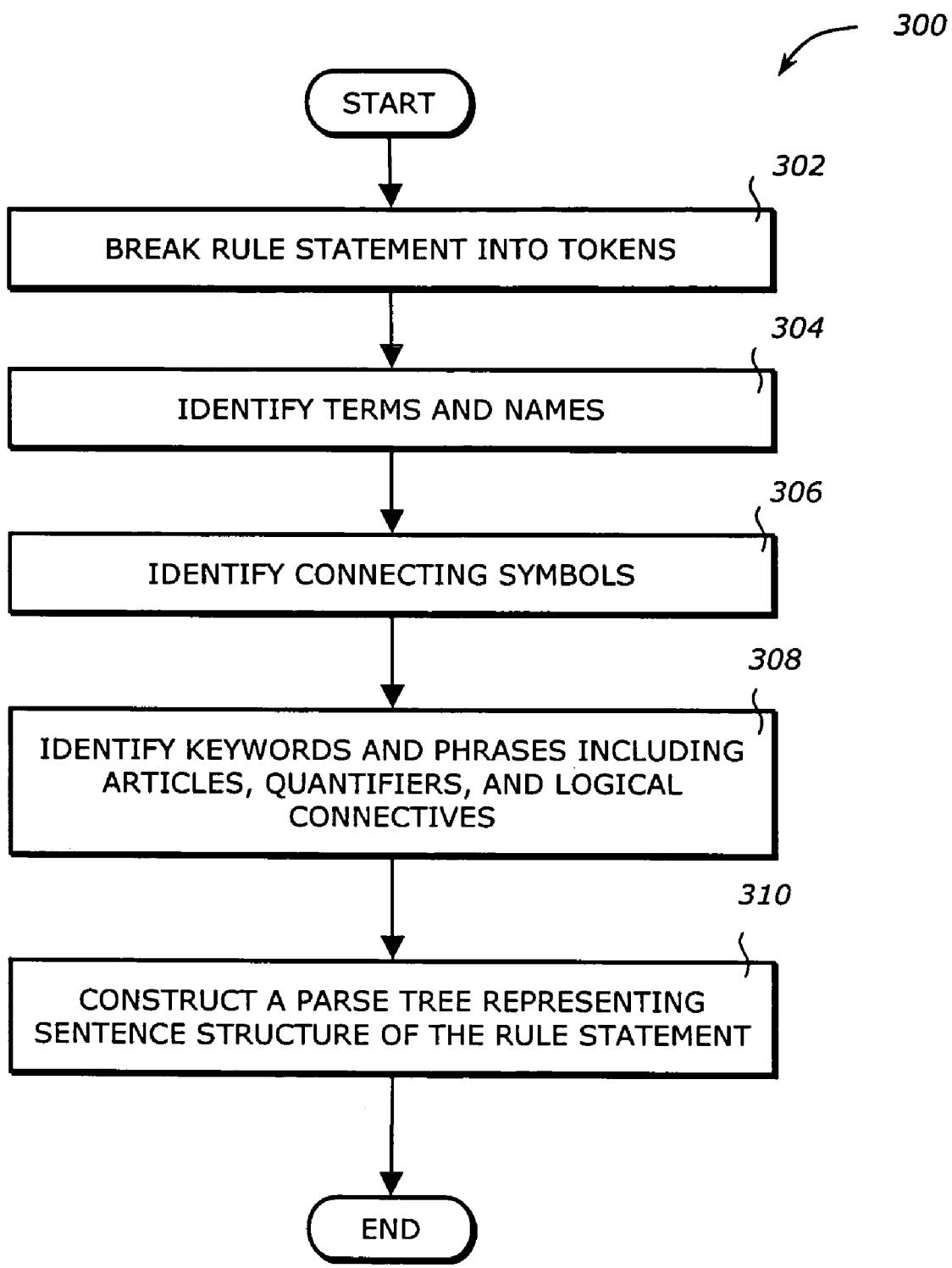
FIG. 3 is a flowchart illustrating a process 300 for parsing a rule statement to produce a language-based structure of the rule statement. Process 300 is called by block 204 of process 200 (FIG. 2).

FIG. 3 is a flowchart illustrating a process 300 for parsing a rule statement to produce a language-based structure of the rule statement. Process 300 is called by block 204 of process 200 (FIG. 2).

Upon Start, process 300 breaks the rule statement into tokens (block 302). Process 300 identifies among the tokens those that correspond to terms, and names if any, using the vocabulary (block 304). Process 300 identifies tokens that correspond to connecting symbols, using the vocabulary (block 306). Process 300 identifies key words and phrases including articles, quantifiers, and logical connectives (block 308). Then, process 300 constructs a parse tree representing the sentence structure of the rule statement in accordance with the grammatical rules of the language (block 310).

Figure 4:
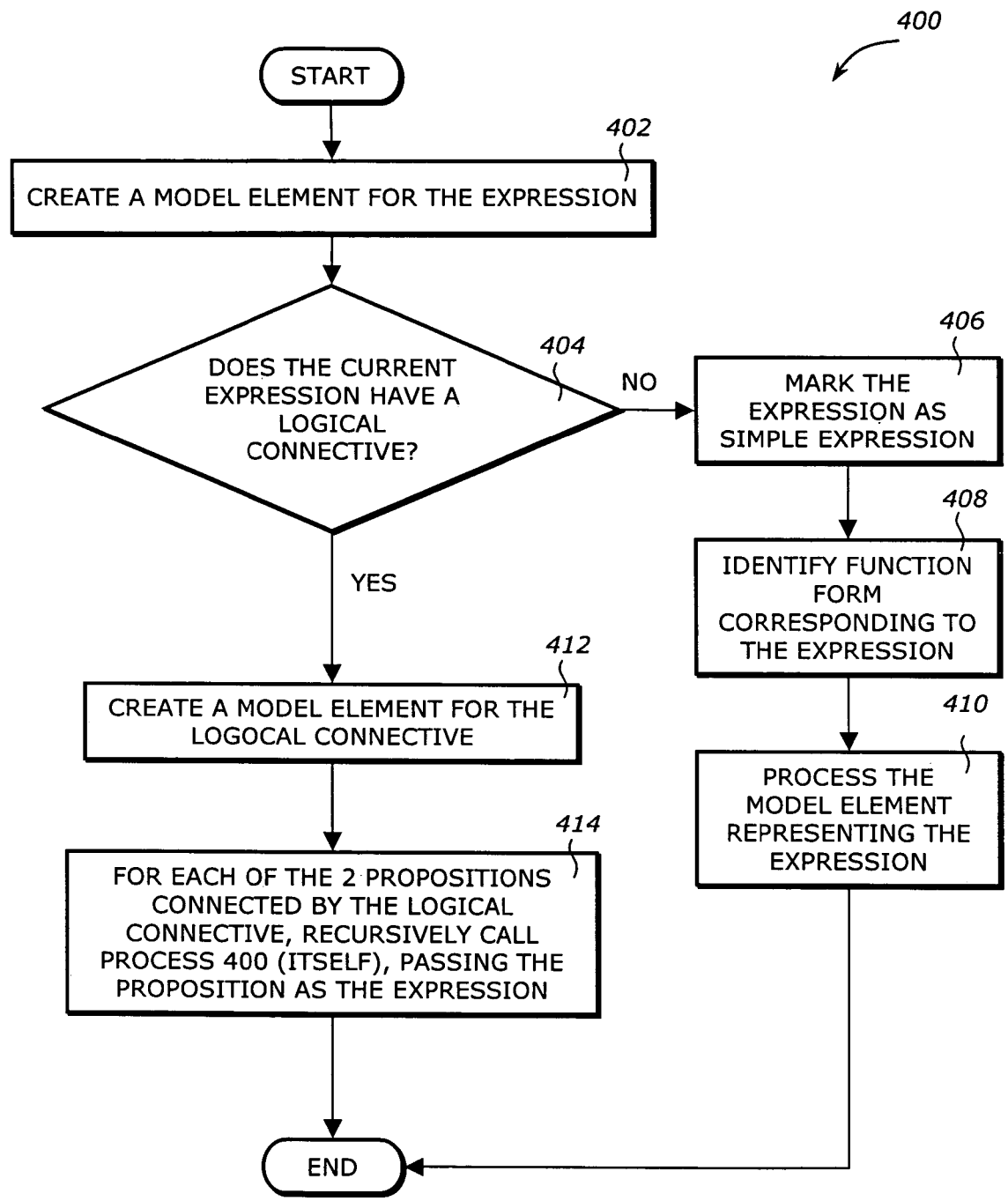
FIG. 4 is a flowchart illustrating an embodiment 400 of the process for processing the language-based structure of a rule statement to generate an expression model for the rule statement. Process 400 is called by block 206 of process 200 (FIG. 2).

FIG. 4 is a flowchart illustrating an embodiment 400 of the process for processing the language-based structure of a rule statement to generate an expression model for the rule statement. Process 400 is called by block 206 of process 200 (FIG. 2).

Upon Start, process 400 creates a model element to represent the expression (block 402). Process 400 determines whether there is a logical connective in the expression, i.e., whether the expression is a complex expression (block 404).

If there is a logical connective in the expression, process 400 creates a model element to represent the logical connective (block 412), then, for each of the two propositions in the expression that are connected by the logical connective, process 400 recursively calls itself, passing the proposition as the new expression (block 414). Note that each of the propositions could be itself a complex expression. After all the recursive calls have ended, process 400 terminates.

If there is no logical connective in the expression, process 400 marks the expression as simple expression (block 406). Process 400 identifies the function form that corresponds to the expression (block 408). The function form can be a sentence form or a nominal restrictive form or a mathematical function form. Process 400 processes the model element representing the expression (block 410), then terminates.

Figure 5:
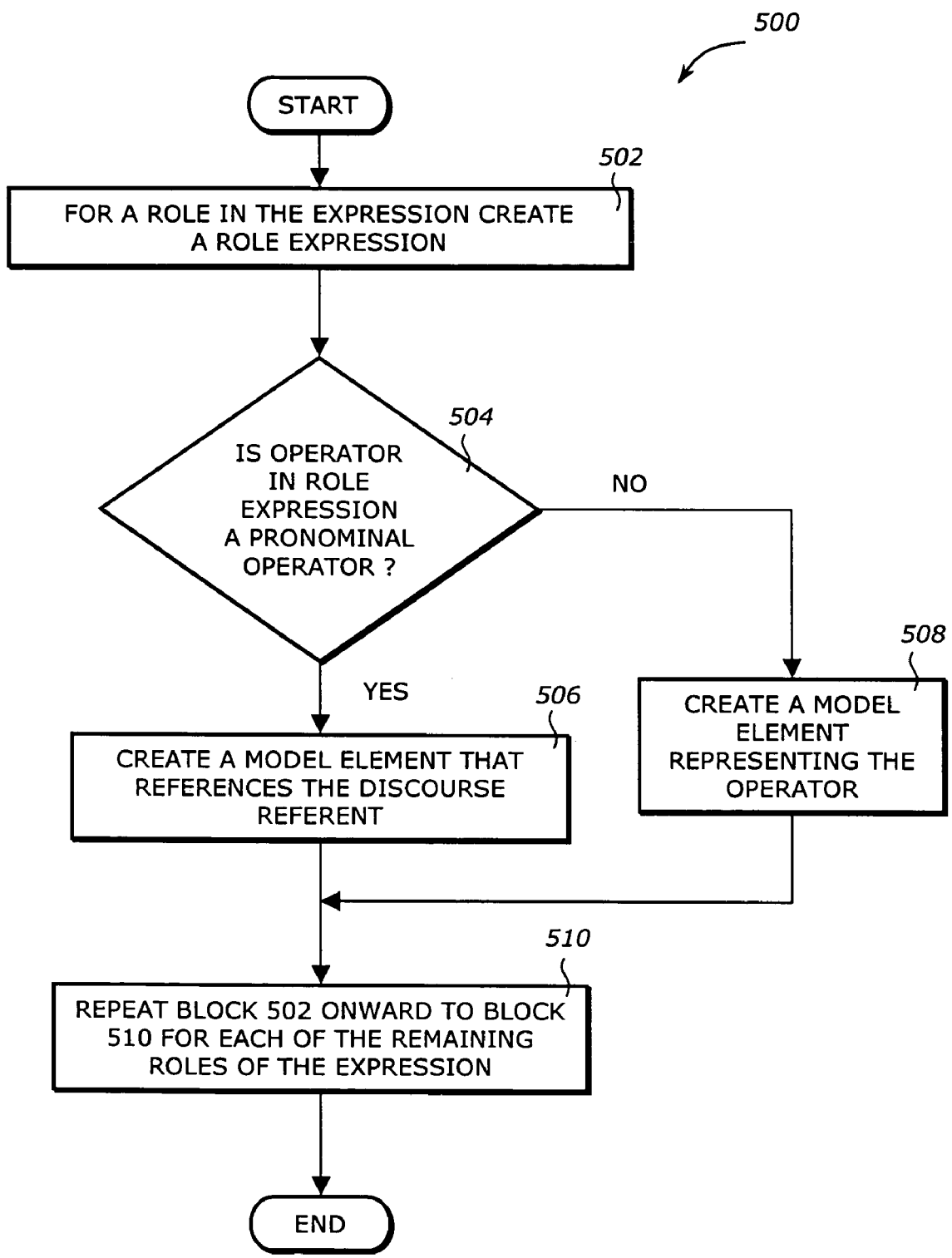
FIG. 5 is a flowchart illustrating the process 410 of process 400 (FIG. 4) for processing a model element representing a simple expression.

FIG. 5 is a flowchart illustrating the process 410 of process 400 (FIG. 4) for processing a model element representing a simple expression. Upon Start, process 410 creates a role expression for a role in the expression (block 502). Recall that a role expression includes an operator that can be a pronominal operator, a quantifier, a parametric operator, or interrogative operator. Process 410 determines whether the operator in the role expression is a pronominal operator (block 504). If it is, process 410 creates a model element to refer to the discourse referent, i.e., the role expression that is determined from the discourse context to be the one referred to by the pronominal operator (block 506) and continues at block 510. Otherwise, process 410 creates a model element to represent the operator (block 508), then continues at block 510. Process 410 repeats block 502 onward to block 510 for each of the remaining roles of the expression (block 510). Process 410 then terminates.

Figure 6:
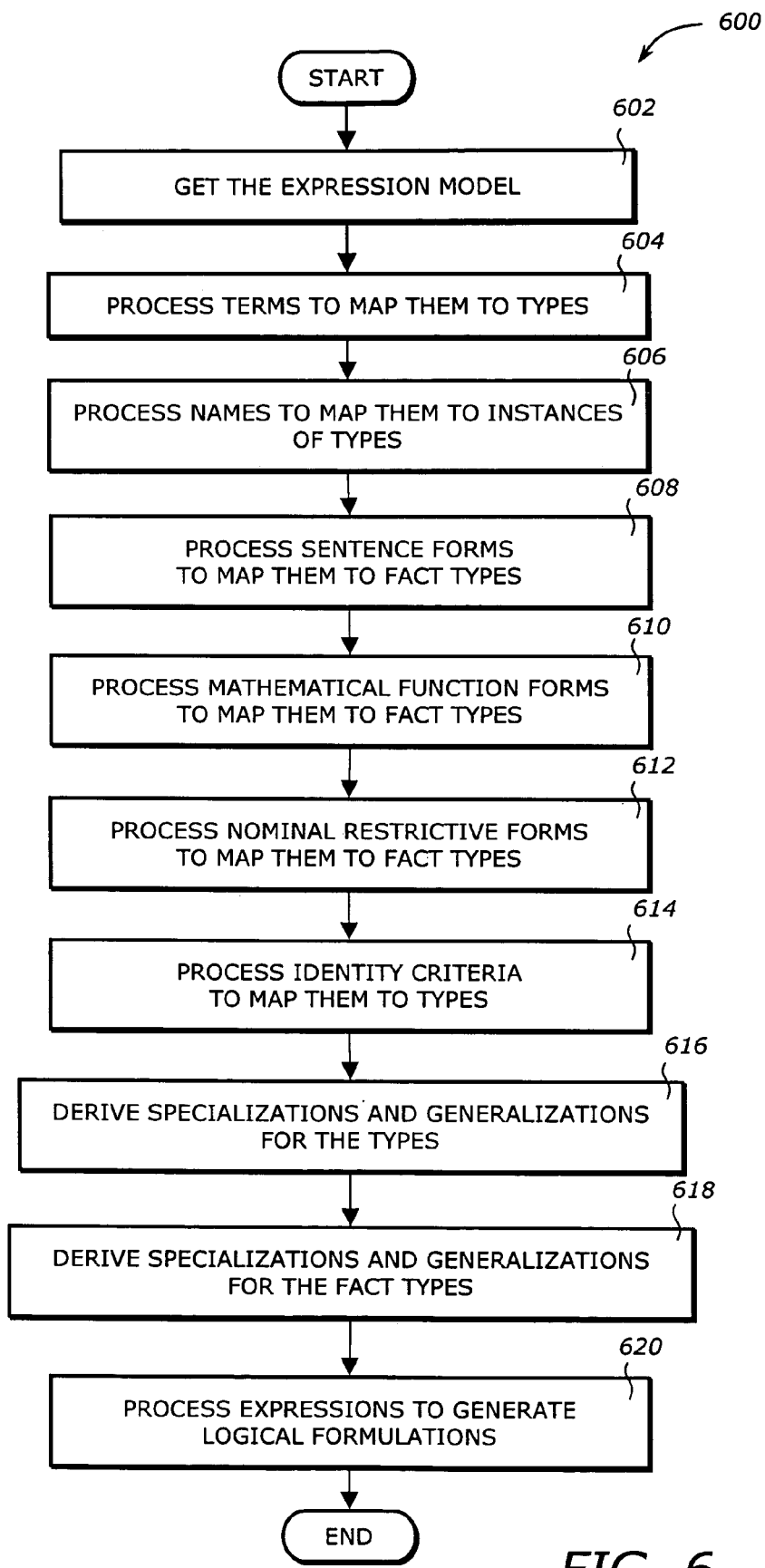
FIG. 6 is a flowchart illustrating a process 600 for processing the expression model to generate a logical model.

FIG. 6 is a flowchart illustrating a process 600 for processing the expression model to generate a logical model. Upon Start, process 600 obtains the expression model (block 602). Process 600 processes the terms included in the expression model to associate each of the terms with a type (block 604). Process 600 processes any names included in the expression model to map each of the names to a type via an association with a modeled instance, each of the names being associated with a term of the processed terms (block 606). Process 600 processes any sentence forms included in the expression model to associate each of the sentence forms with a fact type (block 608). Process 600 processes any mathematical function forms included in the expression model to map each of the mathematical function forms to a fact type via an association with a mathematical function (block 610). Process 600 processes any nominal restrictive forms included in the expression model to a fact type via an association with a nominal restrictive function (block 612). Process 600 processes any identity criteria included in the expression model to map each of the identity criteria to a type via an association with a type identity set (block 614). Then, process 600 derives type specializations and generalizations, if any, for the types (block 616) and derives fact type specializations and generalizations, if any, for the fact types (block 618). Process 600 processes the expressions included in the expression model to generate logical formulations (block 620). Then, process 600 terminates.

Figure 7:
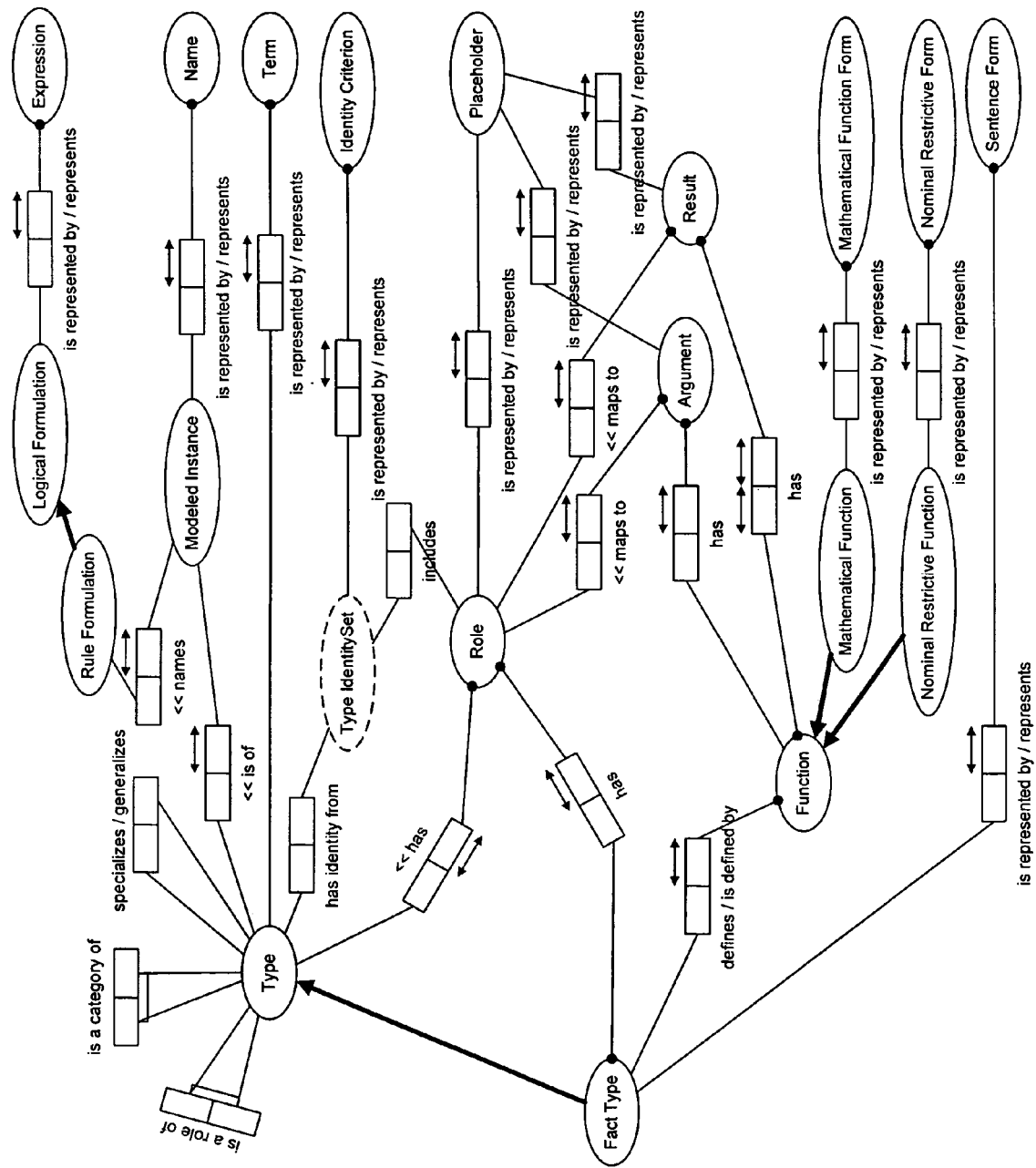
FIG. 7 is a diagram illustrating an Object Role Modeling (ORM) representation of a logical model that can be generated by an embodiment of the present invention, such as the logical model generator 140 in FIG. 1.

FIG. 7 is a diagram illustrating an Object Role Modeling (ORM) representation of a logical model that can be generated by an embodiment of the present invention, such as the logical model generator 140 in FIG. 1. ORM is a well-known method for designing and querying database models at the conceptual level, where the application is described in terms easily understood by non-technical users. In FIG. 7, the objects shown on the right hand side, namely, Expression, Name, Term, Identity Criterion, Placeholder, Mathematical Function Form, Nominal Restrictive Form, and Sentence Form are linguistic elements, i.e., expression model elements, that are provided as inputs to the logical model generator. The remaining objects shown in FIG. 7 are logical objects generated by an embodiment of the present invention. A line with two rectangular boxes in the middle connecting two objects represents an association between the two objects, with the rectangular boxes indicating the nature of the relationship. For example, a sentence form represents a fact type, and a fact type is represented by a sentence form. A Fact Type is a subclass of the class Type (this relationships is indicated by an arrow between the two objects). Two sentence forms represent the same fact type if they are the same in every way, or if they differ only in that their placeholder terms are synonymous instead of identical, or if they have been explicitly defined as being synonymous. Fact type specialization is inferred when a sentence form is the same as another sentence form except that its represented roles differ only in having types that are specializations of the corresponding other role types.

Once the logical model of business types and fact types has been created from the business vocabulary, expressions in the expression model (i.e., the linguistic model), such as expressions of business rules, are translated to logical formulations (block 320 of FIG. 3). Expressions are represented in the linguistic model as compositions of references to logical operations and to symbols such as names, terms and function forms and their placeholders. The generation of a logical formulation from an expression is a straightforward transformation in which the following substitutions are made: (1) each name is replaced by the modeled instance that it represents; (2) each term is replaced by the type that it represents; (3) each function form is replaced by the fact type that it represents; (4) each placeholder used with a function form is replaced by the one role that it either represents directly or maps to indirectly by way of representing an argument or result; and (5) each identity criterion is replaced by the type identity set that it represents.

The following is an example to further illustrate the technique of generating software components from business rule statements. There are 5 rule statements in the example. However, for simplicity and clarity reasons, only the results from parsing Rule 5, Rule 1, and Rule 3 (in this order), i.e., their language-dependent structures (i.e., their grammatical structures) are shown. For the same reasons, for the remaining processes of the technique of the present invention, only the results from processing Rule 5 are shown, namely, the expression model, the logical model, the platform-independent implementation model in 3 parts (component interface model, database model, execution model), the platform-specific implementation model, and the deployable package of software components.

Example

1.A Symbols in a Vocabulary
Terms
business actor
interrogative
employee
id
manager
supervisor
Name
President
Fact Type Sentence Forms
business actor may provide interrogative
business actor may request interrogative
employee has id
employee is supervised by manager
manager supervises employee
employee is under manager
manager is over employee
1.B Details
Symbols Representing the Same Concepts
"manager" is a synonym for "supervisor"
"employee is supervised by manager" represents the same concept as "manager supervises employee"
"employee is under manage" represents the same concept as "manager is over employee"
Generalization Relationships
"employee" is a category of "business actor"
"manager" is a role of "employee"
"id" is a role of "text"
Names Related to Terms for Types
"President" is an instance of "employee"
Identification Schemes
An "employee" is identified by "id"
1.C Rule Statements
Rule 1: It is required that each employee has exactly one id.
Rule 2: It is prohibited that an employee is a manager over the employee.
Rule 3: An employee is under a manager if the manager supervises the employee or the manager is over a manager that supervises the employee.
Rule 4: Each employee may request what manager is over the employee.
Rule 5. The President may provide a new employee has what id and what manager supervises the employee.

2. Grammatical Structure

Rule 5: New Employee Authorization

Assertion: The President may provide a new employee$_1$ has what id$_2$ and what manager$_3$ supervises the employee$_1$ Proposition: business actor may provide interrogative
      Nominal Expression: the President
        Definite article: the
        Name: president
      Verb phrase: may provide
      Compound interrogative
        Interrogative: employee has id
          Proposition: employee has id
            Nominal Expression: a new employee
              Indefinite Article: a
              Modifier: new
              Term: employee
            Verb phrase: has
            Nominal Expression: what id
              Interrogative Operator: what
              Term: id
        Connective: and
        Interrogative manager supervises employee
          Proposition manager supervises employee
            Nominal expression: what manager
              Interrogative Operator: what
              Term: manager
            Verb Phrase: supervises
            Nominal Expression: the employee
              Definite article: the
              Term: employee
Rule 1: One Name Rule
Constraint: It is required that each employee$_1$ has exactly one id$_2$
Key phrase: it is required that
    Proposition: employee has id
      Nominal Expression: each employee
        Quantifier: each
        Term: employee
      Verb Phrase: has
      Nominal Expression: exactly one id
        Quantifier: exactly one
        Term: id Rule 3: Over/Under Definition Rule Rule Text: An employee$_1$ is under a manager$_2$ if the manager$_2$ supervises the employee$_1$ or the manager$_2$ is over a manager$_3$ that supervises the employee$_1$ Assertion: employee is under manager
  Proposition: employee is under manager
    Nominal Expression: an employee
      Indefinite article: an
      Term: employee
    Verb Phrase: is under
    Nominal Expression a manager
      Indefinite article: a
      Term: manager
Condition: if
Compound Proposition:
  Proposition:
    Nominal Expression: the manager
      Definite article: the
      Term: manager
    Verb Phrase: supervises
    Nominal Expression: the employee
      Definite article: the
      Term: manager
  Connective: or
  Proposition: manager is over employee
    Nominal Expression: the manager
      Definite article: the
      Term: manager -continued Verb Phrase: is over
    Nominal Expression: a manager
        Indefinite article: a
        Term: manager
        Functional Restriction: manager that supervises the employee
            Demonstrative: that
            Phrase Text: supervises
            Nominal Restriction: the employee
                Definite article: the
                Term: employee 3. Expression Model Rule 5: New Employee Authorization Assertion: The President may provide a new employee$_1$ has what id$_2$ and what manager$_3$ supervises the employee$_1$

```
Rule id="00ae5ea7bc1a" type="AssertionExpression" Name="new employee authorization"
    RuleAssertsTruthOfExpression factExpression_id="a949218851ac"
        Expression id="a949218851ac" type="SentenceExpression"
            ExpressionIsStatedUsingSentenceForm
sentenceForm_id="0dd4eaae04c3"
                SentenceForm reading="business actor may provide interrogative"
            ExpressionHasValueForPlaceholder
valueExpression_id="2d497e22b3ec"
                -placeholder=1
                Expression id="2d497e22b3ec" type=
                "InstanceNameExpression"
                    InstanceNameExpressionRefersToInstanceName
                    Name="president"
            ExpressionHasValueExpressionForPlaceholder
valueExpression_id="6820dc6082d1"
                -placeholder=2
                Expression id="6820dc6082d1" type="RoleExpression"
                    ExpressionHasValueGivenByValueExpression
                    -valueExpression_id="feaa87daeb9a"
type="FactsAsValuesExpression"
                        FactsAsValuesExpressionTakesFactsFromFactExpression
                        -factExpression_id="d7ea79f48d6a"
                        Expression id="d7ea79f48d6a"
type="BinaryLogicalExpression"
                            BinaryLogicalExpressionHasLogicalOperator
Operator="conjunction"
                            Comment: 'new employee has what id' part
                            ExpressionTakesAsFirstArgument
Expression_id="a9ba67113e91"
                                -type="SentenceExpression"
                                ExpressionIsStatedUsingSentenceForm
                                -sentenceForm_id="190fe704c0d8" reading="employee has id"
                                ExpressionHasValueExpressionForPlaceholder
                                -valueExpression_id="6e180346e28c" placeholder=1
                                    Expression id="6e180346e28c"
type="RoleExpression"
                                        TypeNameIsInRoleExpression
typeName_id="ddac362abaca"
                                            -nameText="employee"
                                        RoleExpressionIsForNewInstance
                                        -roleExpression_id="6e180346e28c"
                                    ExpressionHasValueExpressionForPlaceholder
                                    -valueExpression_id="16c0996abe2a" placeholder=2
                                    Expression id="16c0996abe2a" type="RoleExpression"
                                        TypeNameIsInRoleExpression
typeName_id="abbd13e97212"
                                            -nameText="id"
                                        RoleExpressionAsksWhat
roleExpression_id="16c0996abe2a"
                            Comment: 'what manager supervises the employee' part
                            ExpressionTakesAsSecondArgument
```

```
Expression_id="87a4f50c106d"
    -type="SentenceExpression"
    ExpressionIsStatedUsingSentenceForm
    -sentenceForm_id="ab3040b474ca" reading="manager supervises
    -employee
    ExpressionHasValueExpressionForPlaceholder
    -valueExpression_id="a26e37cf80c2" placeholder=1
        Expression id="a26e37cf80c2" type="RoleExpression"
            TypeNameIsInRoleExpression
typeName_id="009267d177a1"
                -name="manager"
            RoleExpressionAsksWhat
roleExpression_id="a26e37cf80c2"
    ExpressionHasValueExpressionForPlaceholder
    -valueExpression_id="b9163008c321" placeholder=2
        Expression id="b9163008c321" type="RoleExpression"
            RoleExpressionBindsToRoleExpression
            -roleExpression_id="6e180346e28c"
```

4. Logical Model

Concept concept-1: for term business actor concept-2: for interrogative concept-3: for term employee concept-4: for term manager, supervisor concept-5: for term id concept-6: for term text Individual Concepts for Instances instance-1: for name President instance-1 is an instance of concept-3

Fact Type concept-7: for business actor[role-1] may provide interrogative [role-2]

concept-8: for business actor[role-3] may request interrogative [role-4]

concept-9: for employee [role-5] has id [role-6]

concept-10: for employee [role-7] is supervised by manager [role-8], manager [role-8] supervises employee [role-7]

concept-11: for employee [role-9] is under manager [role-10], manager [role-10] is over employee [role-9]

Reference Schemes:

reference scheme for concept-3: scheme uses role-6

Generalizations:

concept-3 is a category of concept-1 concept-4 is a category of concept-3 concept-5 is a role of concept-6

Logical model for rule: New Employee Authorization

```
Rule Name="new employee authorization"
    RuleAssertsTruthOfExpression "SentenceExpression"
        ExpressionIsStatedUsingFactType factType="concept-7"
        ExpressionHasValueForPlaceholder instanceName="instance-1"
placeholder=1
        ExpressionHasValueForPlaceholder type="RoleExpression"
placeholder=2
            ExpressionHasValueGivenBy type="FactsAsValuesExpression"
            FactsAsValuesExpressionTakesFactsFrom
type="BinaryLogicalExpression"
                BinaryLogicalExpressionHasLogicalOperator
Operator="conjunction"
                Comment: 'new employee has what id' part
                ExpressionTakesAsFirstArgument type="SentenceExpression"
                    ExpressionIsStatedUsingFactType factType="concept-9"
                    ExpressionHasValueForPlaceholder type="concept-3"
placeholder=1
                    ExpressionHasValueForPlaceholder type="concept-5"
```

```
placeholder=2
        Comment: 'what manager supervises the employee' part
        ExpressionTakesAsSecondArgument
        type="SentenceExpression"
            ExpressionIsStatedUsingSentenceForm factType="concept-
10"
            ExpressionHasValueForPlaceholder type="concept-4"
placeholder=1
            ExpressionHasValueForPlaceholder type="concept-3"
placeholder=2
```

5. Platform-Independent Implementation Model
5.A Component Interface Model The following interfaces are generated for the management chain example:

```
interface ManagementChainComponent {
    public ManagerOverEmployee Rule4Operation (Employee employee)
    public void Rule5Operation(NewEmployee newEmployee)
}
interface Employee {
    text: id
}
interface ManagerOverEmployee {
    Manager-Collection: manager-collection
    //Note: Manager-Collection is a collection of Employee (each
of whom is a manager) objects
}
interface NewEmployee {
    text: id
    Manager-Collection: manager-collection
    //Note: Manager-Collection is a collection of Employee (each
of whom is a manager) objects
}
```

5.B Database Model

```
table Employee {
    Identity-type: identity_column;
    Text: id
}
table Manager_Supervises_Employee {
    Identity-type identity_from_Employee_for_employee
    //Note: The above is a foreign key to the identity of employee
    table representing the employee
    Identity-type identity_from_Employee_for_manager
    //Note: The above is a foreign key to the identity of employee
    table representing the manager
}
```

5.C Execution Model
Execution model for method of Rule5Operation:
If the user providing the information is the President then:
  //comment: check rule 1
  If the newEmployee has no id, then abort the transaction.
  If the id of the newEmployee is already an id of a known
      employee, then abort the transaction.
  Accept the (new) fact that an employee exists that has the id
  For each manager in the manager-collection of the new-
      Employee,
    Accept a (new) fact that the manager supervises the
        employee
  //Comment: verify rule 2 based on rule 3
  If the new employee supervises that same employee
      or the employee is over a manager that supervises the
      employee, then abort the transaction.
  Commit the transaction
Otherwise
  Reject the provided information

6. Platform-Specific Implementation Model

Given that the target platform is the .NET platform and the target database is Microsoft SQL Server, the following interfaces and SQL database are generated:

.NET specific Component Interfaces

```
//.NET interfaces for ManagementChain
using System;
using System.Collections;
namespace ManagementChain {
    interface ManagementChainComponent {
        ManagerOverEmployee Rule4Operation (Employee employee);
        void Rule5Operation(NewEmployee newEmployee);
    }
    interface Employee {
        string ID {get; set;}
    }
    interface ManagerOverEmployee {
        ICollection ManagerCollection {get; set;}
    }
    interface NewEmployee {
        string ID {get; set;}
        ICollection ManagerCollection {get; set;}
    }
}
```

SQL Server Specific Database Script

```
create table Employee (
    identity_column int,
    id nvarchar(32),
    primary key (identify_column)
)
create table Manager_Supervises_Employee (
    employee int foreign key references Employee(identity_column),
    manager int foreign key references Employee(identity_column),
    primary key (employee, manager)
)
```

7. Deployable Package

The deployment package consists of a database script that creates the database and in installation file that installs the executables. For example, the deployable component for the Microsoft windows environment consists of an install.msi component which includes:

ManagementChain.sql—the SQL script that creates the database

ManagementChain.dll—the .NET executable component

This concludes the above example.

Figure 8:
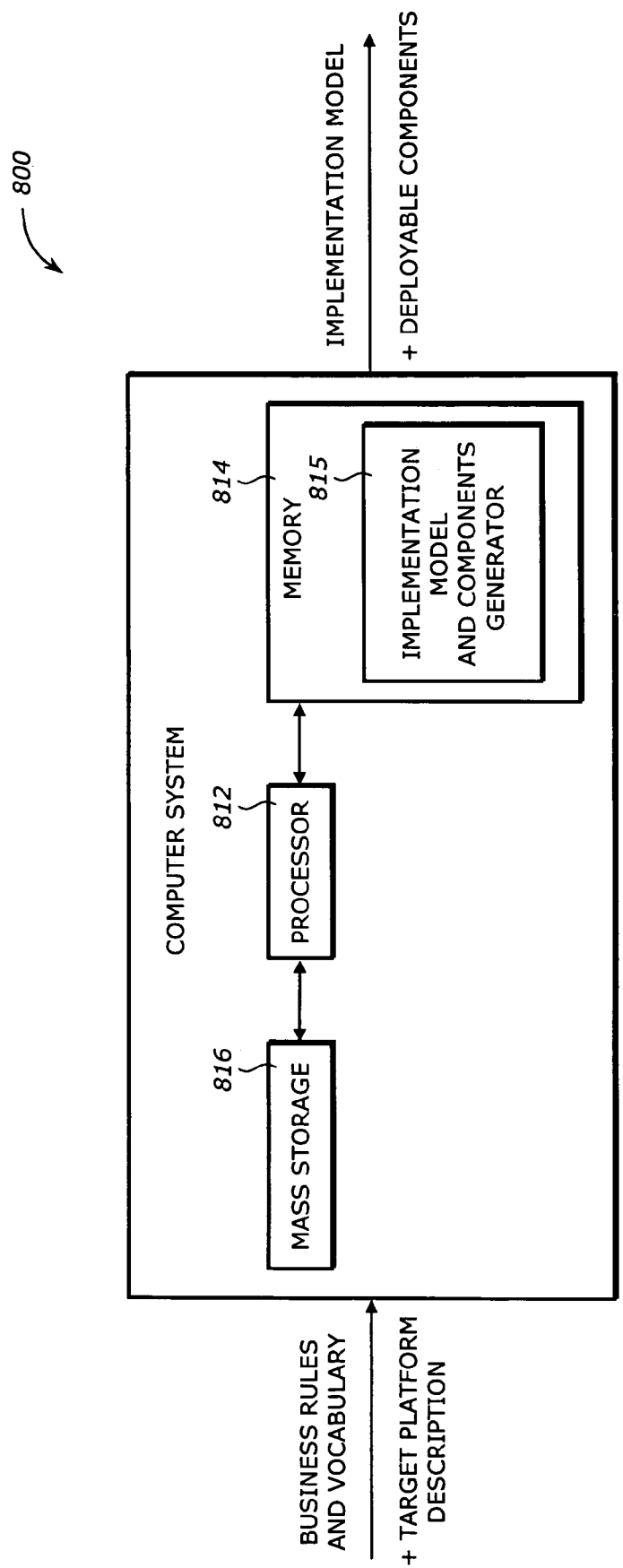
FIG. 8 is a block diagram illustrating a computer system 800 in which one embodiment of the invention can be practiced.

FIG. 8 is a block diagram illustrating a computer system 800 in which one embodiment of the invention can be practiced.

The computer system 800 includes a processor 812, a memory 814, and a mass storage device 816. The computer system 800 receives a stream of input representing a set of business rules and a vocabulary of a natural language, processes the business rules and the vocabulary in accordance to the method of the present invention, and outputs a platform-independent implementation model in three parts. When a target platform description is also provided, the system 800 transforms the platform-independent implementation model into a platform-specific implementation model and generates a deployable package of software components from the platform-specific implementation model.

The processor 812 represents a central processing unit of any type of architecture, such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The memory 814 stores system code and data. The memory 814 is typically implemented with dynamic random access memory (DRAM) or static random access memory (SRAM). The system memory may include program code or code segments implementing one embodiment of the invention. The memory 814 includes an implementation model and components generator 815 of the present invention when loaded from the mass storage 816. The implementation model and components generator 815 implements all or part of the system 100 shown in FIG. 1. The implementation model and components generator 815 may also simulate the functions of system 100 described herein. The implementation model and components generator 815 contains instructions that, when executed by the processor 812, cause the processor to perform the tasks or operations as described above.

The mass storage device 816 stores archive information such as code, programs, files, data, databases, applications, and operating systems. The mass storage device 816 may include compact disk (CD) ROM, a digital video/versatile disc (DVD), floppy drive, and hard drive, and any other magnetic or optic storage devices such as tape drive, tape library, redundant arrays of inexpensive disks (RAIDs), etc. The mass storage device 816 provides a mechanism to read machine-accessible media. The machine-accessible media may contain computer readable program code to perform tasks as described above.

Elements of an embodiment of the invention may be implemented by hardware, firmware, software or any combination thereof. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described above. The machine accessible medium may also include program code embedded therein. The program code may include machine-readable code to perform the operations described above. The term "data" herein refers to any type of information that is encoded for machine-readable purposes. Therefore, it may include program, code, data, file, etc.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method for generating software components from one or more rule statements expressed in a language, the method comprising:

at a computing system that includes a processor, memory, and mass storage device, receiving symbols of a vocabulary of a natural language, the natural language having grammatical rules, and details about each of the symbols;

receiving, at the computing system, at least one rule statement expressed using the symbols of the vocabulary of the natural language;

at the computing system, parsing the rule statement in accordance with the natural language grammatical rules to generate a language-based structure of the rule statement that identifies the symbols used and their interrelationships with respect to a sentence structure, wherein the parsing reports how each word in the rule statement is categorized into:

a) terms defined in the vocabulary, b) names defined in the vocabulary for individual things, c) connecting symbols of function forms defined in the vocabulary, d) key words and phrases, quantifiers, and logical connectives, and e) words that are not recognized;

at the computing system, processing the language-based structure of the rule statement corresponding to an expression to generate an expression model;

at the computing system, processing the expression model to generate a logical model wherein processing the expression model comprises:

a) relating synonymous terms to a single concept;

b) relating synonymous forms and related noun forms to a single fact type;

c) relating synonymous names to a single instance;

d) relating each instance to its corresponding concept;

e) determining identifying fact types for concepts;

determining generalizations between concepts; and g) reporting logical inconsistencies, if any;

at the computing system, processing the logical model to generate a platform-independent implementation model in response to a request for such generation;

at the computing system, receiving a specific target platform description; and at the computing system, processing the platform-independent implementation model using the specific target platform description to generate a platform-specific implementation model.

2. The method of claim 1 further comprising:

processing the platform-specific model to generate software components for deployment.

3. The method of claim 1 further comprising:

providing feedback to a user regarding the rule statement to resolve logical inconsistency.

4. The method of claim 1 wherein parsing the rule statement comprises:
- breaking the rule statement into tokens;
- identifying, among the tokens, first tokens that correspond to terms, and, if the rule statement includes names, second tokens that correspond to the names;
- identifying, among the tokens, third tokens that correspond to connecting symbols;
- identifying, among the tokens, fourth tokens that correspond to key words and phrases; and
- constructing a parse tree representing the language-based structure of the rule statement.

5. The method of claim 1 wherein processing the language-based structure of the rule statement corresponding to an expression to generate an expression model comprises:
- creating a model element for the expression;
- determining whether the expression has a logical connective;
- if the expression has no logical connective,
  - marking the expression as a simple expression;
  - identifying function form that corresponds to the expression; and
  - processing the model element representing the expression;
- if the expression has a logical connective,
  - creating a model element for the logical connective.

6. The method of claim 5 further comprising:
- if the expression has a logical connective,
  - repeating recursively the operations in claim 5 for each of the propositions included in the expression that are connected by the logical connective, substituting each of the propositions as the expression in the operations.

7. The method of claim 5 wherein processing the model element representing the expression comprises:
- for a role in the expression, creating a role expression;
- determining whether the operator in the role expression is a pronominal operator;
- if the operator in the role expression is a pronominal operator referring to a discourse referent,
  - creating a model element referencing the discourse referent;
- else, creating a model element representing the operator.

8. The method of claim 1 wherein processing the expression model to generate a logical model comprises:
- processing terms included in the expression model to associate each of the terms with a type;
- processing a sentence form included in the expression model to associate the sentence form with a fact type;
- if the expression model includes a name, processing the name to map the name to a type, the name corresponding to a term of the processed terms;
- if the expression model includes a nominal restrictive form, processing the nominal restrictive form to map the nominal restrictive form to a fact type;
- if the expression model includes a mathematical function form, processing the mathematical function form to map the mathematical function form to a fact type;
- if the expression model includes an identity criterion, processing the identity criterion to map the identity criterion to a type;
- if at least one of the types has type specializations or generalizations, deriving the type specializations and generalizations for the one of the types;
- if at least one of the types has fact type specializations or generalizations, deriving the fact type specializations and generalizations for the one of the fact types; and
- if the expression model includes an expression, processing the expression to generate a logical formulation, the expression including at least one of a name, a term, a function form having at least a placeholder, and an identity criterion.

9. The method of claim 1 wherein processing the logical model to generate a platform-independent implementation model comprises:
- generating a component interface model from the business rule if the business rule is an authorization rule to provide information or an authorization rule to request information;
- generating a database model from the logical model; and
- generating an execution model from the logical model.

10. The method of claim 1 wherein the target platform description comprises:
- specification of a component interface technology;
- specification of a database system; and
- specification of a programming platform.

11. A system for generating software components from one or more rule statements expressed in a natural language, the system comprising:
- a computing system having a processor and one or more storage media in communication with the processor, the one or more storage media storing:
  - a natural language parser for using the processor in parsing at least one rule statement based on a vocabulary of a natural language and grammatical rules of the natural language to generate a language-dependent structure of the rule statement, wherein the natural language parser identifies symbols used and their interrelationships with respect to a sentence structure, wherein the parsing reports how each word in the rule statement is categorized into:
    a) terms defined in the vocabulary,
    b) names defined in the vocabulary for individual things,
    c) connecting symbols of function forms defined in the vocabulary,
    d) key words and phrases, quantifiers, and logical connectives, and
    e) words that are not recognized;
  - an expression model generator for using the processor in processing the language-dependent structure of the rule statement to generate an expression model;
  - a logical model generator for using the processor in processing the expression model to generate a logical model, wherein generating the logical model comprises:
    a) relating synonymous terms to a single concept;
    b) relating synonymous forms and related noun forms to a single fact type;
    c) relating synonymous names to a single instance;
    d) relating each instance to its corresponding concept;
    e) determining identifying fact types for concepts;
    f) determining generalizations between concepts; and
    g) reporting logical inconsistencies, if any;
  - a platform-independent implementation model generator for using the processor in processing the logical model to generate a platform-independent implementation model in response to a request for such generation; and
  - a platform-specific implementation model generator for using the processor in receiving description of a specific target platform and processing the platform-independent implementation model using the description of the target platform to generate a platform-specific implementation model.

12. The system of claim 11 further comprising:
a software component generator for generating and assembling software components for deployment on the target platform.

13. The system of claim 11 further comprising:
a graphic user interface for receiving the rule statement and the vocabulary of the natural language;
wherein the logical model generator is in communication with the natural language parser and the graphical user interface to provide feedback to a user regarding logical consistency of the rule statement.

14. An article of manufacture embodied on a machine-accessible tangible medium, to be used for generating software components from one or more rule statements expressed in a natural language, the article of manufacture comprising:
the machine-accessible, tangible medium storing computer-executable instructions that, when accessed and executed by a machine, cause the machine to:
receive symbols of a vocabulary of a natural language, the natural language having grammatical rules, and details about each of the symbols;
receive at least one rule statement expressed using the symbols of the vocabulary of the natural language;
parse the rule statement in accordance with the natural language grammatical rules to generate a language-based structure of the rule statement that identifies the symbols used and their interrelationships with respect to a sentence structure, wherein the parsing reports how each word in the rule statement is categorized into:
a) terms defined in the vocabulary,
b) names defined in the vocabulary for individual things,
c) connecting symbols of function forms defined in the vocabulary,
d) key words and phrases, quantifiers, and logical connectives, and
e) words that are not recognized;
process the language-based structure of the rule statement corresponding to an expression to generate an expression model;
process the expression model to generate a logical model wherein processing the expression model comprises:
a) relating synonymous terms to a single concept;
b) relating synonymous forms and related noun forms to a single fact type;
c) relating synonymous names to a single instance;
d) relating each instance to its corresponding concept;
e) determining identifying fact types for concepts;
f) determining generalizations between concepts; and
g) reporting logical inconsistencies, if any;
process the logical model to generate a platform-independent implementation model in response to a request for such generation;
receive a specific target platform description; and
process the platform-independent implementation model using the specific target platform description to generate a platform-specific implementation model.

15. The article of manufacture of claim 14 wherein the data further comprises data that, when accessed by the machine, causes the machine to perform operations comprising:
processing the platform-specific model to generate software components for deployment.

16. The article of manufacture of claim 14 wherein the data further comprises data that, when accessed by the machine, causes the machine to perform operations comprising:
providing feedback to a user regarding the rule statement to resolve logical inconsistency.

17. The article of manufacture of claim 14 wherein the data causing the machine to perform the operation of parsing the rule statement comprises data that, when accessed by the machine, causes the machine to perform operations comprising:
breaking the rule statement into tokens;
identifying, among the tokens, first tokens that correspond to terms, and, if the rule statement includes names, second tokens that correspond to the names;
identifying, among the tokens, third tokens that correspond to connecting symbols;
identifying, among the tokens, fourth tokens that correspond to key words and phrases; and
constructing a parse tree representing the language-based structure of the rule statement.

18. The article of manufacture of claim 14 wherein the data causing the machine to perform the operation of processing the language-based structure of the rule statement corresponding to an expression to generate an expression model comprises data that, when accessed by the machine, causes the machine to perform operations comprising:
creating a model element for the expression;
determining whether the expression has a logical connective;
if the expression has no logical connective,
marking the expression as a simple expression;
identifying function form that corresponds to the expression; and
processing the model element representing the expression;
if the expression has a logical connective,
creating a model element for the logical connective.

19. The article of manufacture of claim 18 wherein the data causing the machine to perform the operation of processing the language-based structure of the rule statement corresponding to an expression to generate an expression model further comprises data that, when accessed by the machine, causes the machine to perform operations comprising:
if the expression has a logical connective,
repeating recursively the operations in claim 5 for each of the propositions included in the expression that are connected by the logical connective, substituting each of the proposition as the expression in the operations.

20. The article of manufacture of claim 18 wherein the data causing the machine to perform the operation of processing the model element representing the expression comprises data that, when accessed by the machine, causes the machine to perform operations comprising:
for a role in the expression, creating a role expression;
determining whether the operator in the role expression is a pronominal operator;
if the operator in the role expression is a pronominal operator referring to a discourse referent,
creating a model element referencing the discourse referent;
else, creating a model element representing the operator.

21. The article of manufacture of claim 14 wherein the data causing the machine to perform the operation of processing the expression model to generate a logical model comprises data that, when accessed by the machine, causes the machine to perform operations comprising:
processing terms included in the expression model to associate each of the terms with a type;
processing a sentence form included in the expression model to associate the sentence form with a fact type;

if the expression model includes a name, processing the name to map the name to a type, the name corresponding to a term of the processed terms;

if the expression model includes a nominal restrictive form, processing the nominal restrictive form to map the nominal restrictive form to a fact type;

if the expression model includes a mathematical function form, processing the mathematical function form to map the mathematical function form to a fact type;

if the expression model includes an identity criterion, processing the identity criterion to map the identity criterion to a type;

if at least one of the types has type specializations or generalizations, deriving the type specializations and generalizations for the one of the types;

if at least one of the types has fact type specializations or generalizations, deriving the fact type specializations and generalizations for the one of the fact types; and if the expression model includes an expression, processing the expression to generate a logical formulation, the expression including at least one of a name, a term, a function form having at least a placeholder, and an identity criterion.

22. The article of manufacture of claim 14 wherein the data causing the machine to perform the operation of processing the logical model to generate a platform-independent implementation model comprises data that, when accessed by the machine, causes the machine to perform operations comprising:

generating a component interface model from the business rule if the business rule is an authorization rule to provide information or an authorization rule to request information;

generating a database model from the logical model; and generating an execution model from the logical model.

23. The article of manufacture of claim 14 wherein the target platform description comprises:

specification of a component interface technology;

specification of a database system; and specification of a programming platform.

24. A system for generating software components from one or more rule statements expressed in a natural language, the method, the system comprising:

a processor;

a memory coupled to the processor and the memory containing instructions that, when executed by the processor, cause the processor to:

receive symbols of a vocabulary of a natural language, the natural language having grammatical rules, and details about each of the symbols;

receive at least one rule statement expressed using the symbols of the vocabulary of the natural language;

parse the rule statement in accordance with the natural language grammatical rules to generate a language-based structure of the rule statement that identifies the symbols used and their interrelationships with respect to a sentence structure, wherein the parsing reports how each word in the rule statement is categorized into:

a) terms defined in the vocabulary, b) names defined in the vocabulary for individual things, c) connecting symbols of function forms defined in the vocabulary, d) key words and phrases, quantifiers, and logical connectives, and e) words that are not recognized;

process the language-based structure of the rule statement corresponding to an expression to generate an expression model;

process the expression model to generate a logical model wherein processing the expression model comprises:

a) relating synonymous terms to a single concept;

b) relating synonymous forms and related noun forms to a single fact type;

c) relating synonymous names to a single instance;

d) relating each instance to its corresponding concept;

e) determining identifying fact types for concepts;

f) determining generalizations between concepts; and g) reporting logical inconsistencies, if any;

process the logical model to generate a platform-independent implementation model in response to a request for such generation;

receive a specific target platform description; and process the platform-independent implementation model using the specific target platform description to generate a platform-specific implementation model.

25. The system of claim 24 wherein the instructions further comprise instructions that, when executed by the processor, cause the processor to:

process the platform-specific model to generate software components for deployment.

26. The system of claim 24 wherein the instructions further comprise instructions that, when executed by the processor, cause the processor to:

provide feedback to a user regarding the rule statement to resolve logical inconsistency.

27. The system of claim 24 wherein the instructions causing the processor to parse the rule statement comprise instructions that, when executed by the processor, cause the processor to:

break the rule statement into tokens;

identify, among the tokens, first tokens that correspond to terms, and, if the rule statement includes names, second tokens that correspond to the names;

identify, among the tokens, third tokens that correspond to connecting symbols;

identify, among the tokens, fourth tokens that correspond to key words and phrases; and construct a parse tree representing the language-based structure of the rule statement.

28. The system of claim 24 wherein the instructions causing the processor to process the language-based structure of the rule statement corresponding to an expression to generate an expression model comprise instructions that, when executed by the processor, cause the processor to:

create a model element for the expression;

determine whether the expression has a logical connective;

if the expression has no logical connective, mark the expression as a simple expression;

identify function form that corresponds to the expression; and process the model element representing the expression;

if the expression has a logical connective, create a model element for the logical connective.

29. The system of claim 28 wherein the instructions causing the processor to process the language-based structure of the rule statement to generate an expression model further comprise instructions that, when executed by the processor, cause the processor to:

if the expression has a logical connective,
repeat recursively the operations in claim 5 for each of the propositions included in the expression that are connected by the logical connective, substituting each of the proposition as the expression in the operations.

30. The system of claim 28 wherein the instructions causing the processor to process the model element representing the expression comprise instructions that, when executed by the processor, cause the processor to:
for a role in the expression, creating a role expression;
determine whether the operator in the role expression is a pronominal operator;
if the operator in the role expression is a pronominal operator referring to a discourse referent,
create a model element referencing the discourse referent;
else, create a model element representing the operator.

31. The system of claim 24 wherein the instructions causing the processor to process the expression model to generate a logical model comprise instructions that, when executed by the processor, cause the processor to:
process terms included in the expression model to associate each of the terms with a type;
process a sentence form included in the expression model to associate the sentence form with a fact type;
if the expression model includes a name, process the name to map the name to a type, the name corresponding to a term of the processed terms;
if the expression model includes a nominal restrictive form, process the nominal restrictive form to map the nominal restrictive form to a fact type;
if the expression model includes a mathematical function form, process the mathematical function form to map the mathematical function form to a fact type;
if the expression model includes an identity criterion, process the identity criterion to map the identity criterion to a type;
if at least one of the types has type specializations or generalizations, derive the type specializations and generalizations for the one of the types;
if at least one of the types has fact type specializations or generalizations, derive the fact type specializations and generalizations for the one of the fact types; and
if the expression model includes an expression, process the expression to generate a logical formulation, the expression including at least one of a name, a term, a function form having at least a placeholder, and an identity criterion.

32. The system of claim 24 wherein the instructions causing the processor to process the logical model to generate a platform-independent implementation model comprise instructions that, when executed by the processor, cause the processor to:
generate a component interface model from the business rule if the business rule is an authorization rule to provide information or an authorization rule to request information;
generate a database model from the logical model; and
generate an execution model from the logical model.

33. The system of claim 24 wherein the target platform description comprises:
specification of a component interface technology;
specification of a database system; and
specification of a programming platform.

* * * * *

UNITED STATES PATENT AND TRADEMARK OFFICE
CERTIFICATE OF CORRECTION

| | | |
|---|---|---|
| PATENT NO. | : 8,050,907 B2 | Page 1 of 1 |
| APPLICATION NO. | : 10/903452 | |
| DATED | : November 1, 2011 | |
| INVENTOR(S) | : Donald Edward Baisley et al. | |

It is certified that error appears in the above-identified patent and that said Letters Patent is hereby corrected as shown below:

In column 22, line 50, in Claim 1, before "determining" insert -- f) --.

Signed and Sealed this
Sixth Day of December, 2011

David J. Kappos
*Director of the United States Patent and Trademark Office*